United States Patent [19]

Kakumoto et al.

[11] 4,243,932

[45] Jan. 6, 1981

[54] METHOD AND SYSTEM FOR CHECKING SEALED CONTAINERS FOR PINHOLES BY COMPARING TWO DISCHARGE CURRENTS

[75] Inventors: Michio Kakumoto, Naruto; Eizi Oe, Tokushima; Hirosi Nakagawa, Naruto, all of Japan

[73] Assignee: Otsuka Pharmaceutical Factory Inc., Japan

[21] Appl. No.: 890,686

[22] Filed: Mar. 27, 1978

[30] Foreign Application Priority Data

Nov. 30, 1977 [JP] Japan .................... 52/144308

[51] Int. Cl.³ .................. G01R 31/12; G01M 3/40
[52] U.S. Cl. .......................... 324/54; 73/52
[58] Field of Search ............. 324/54; 73/52

[56] References Cited

U.S. PATENT DOCUMENTS

| | | |
|---|---|---|
| 3,346,809 | 10/1967 | Bader et al. .................. 324/54 |
| 3,374,428 | 3/1968 | Eager et al. .................. 324/54 |
| 3,555,413 | 1/1971 | Matsuba ....................... 324/54 |
| 4,125,805 | 11/1978 | Nagamatsu .................... 324/54 |

FOREIGN PATENT DOCUMENTS 48-45250  6/1973  Japan.
50-6998   3/1975  Japan.

Primary Examiner—Gerard R. Strecker
Attorney, Agent, or Firm—Toren, McGeady and Stanger

[57] ABSTRACT

A method of and a system for checking sealed containers for pinholes with contents enclosed therein by placing a sealed container between first and second electrodes, impressing voltage across the first electrode and second electrodes to generate two discharge current flows on the container and between the first electrode and second electrode respectively, detecting the discharge currents individually and converting the difference between the detected values to a detection signal value.

6 Claims, 20 Drawing Figures

METHOD AND SYSTEM FOR CHECKING SEALED CONTAINERS FOR PINHOLES BY COMPARING TWO DISCHARGE CURRENTS

This invention relates to a method and a system for checking sealed containers of plastics, glass or like electrical insulating material for pinholes with contents such as a parenteral solution or retorted food enclosed therein.

It is already known to check such sealed containers for pinholes by placing the container between a pair of electrodes, impressing voltage across the electrodes to generate a discharge current on the container and detecting the current to judge whether the container has a pinhole or not.

The known method will be described below in greater detail with reference to an apparatus (see FIG. 1) for practicing the method and a circuit (see FIG. 2) equivalent thereto. FIG. 1 shows the container 4 to be checked as placed between a first electrode 10 and a second electrode 20. The electrode 20 is connected to one terminal of impedance means 70. An A.C. power supply 60 is connected to the electrode 10 and to the other terminal of the impedance means 70. Judging means 50 is coupled to the impedance means 70. A terminal of the power supply 60 is grounded. The known apparatus can be interpreted as being equivalent to the electric circuit shown in FIG. 2, in which indicated at $C_{10}$ is the capacitance between the electrode 10 and the contents of the container 4, at $C_{20}$ the capacitance between the electrode 20 and the contents, and at R the electric resistance of the contents.

When voltage is impressed across the electrodes 10 and 20 in this arrangement, a corona discharge current $i_1$ flows across the electrodes if the container 4 has no pinhole, whereas the voltage generates a spark discharge current $i_2$ across the electrodes in the presence of a pinhole. Since $i_2 > i_1$, a threshold value $i_s$ (definite reference value) having the relation of: $i_2 > i_s > i_1$ is predetermined for the verification, such that if the discharge current detected across the electrodes for the container is greater than $i_s$, the result indicates the presence of a pinhole, whereas if it is smaller than $i_s$, the container is accepted as having no pinhole.

The conventional checking method would be fully useful if there is a great difference between the corona discharge current and the spark discharge current, but the actual difference therebetween is not as great as is expected. In fact, the ratio of the rejection signal value to the acceptance signal value, S/N (or $i_2/i_1$ in the known method described) is up to about 2, although dependent on the kind of the containers checked. This is indicative of a considerable likelihood of misjudgment.

Additionally the conventional method gives widely varying detection signal values under the influence of variations in the wall thickness of the container, surface stains thereon or errors involved in positioning the container between the electrodes. Thus, if a higher threshold value $i_s$ is used, there is an increasing tendency to accept a reject as a flawless article. Conversely if a lower value $i_s$ is used, it becomes more likely to mistake an acceptable article for a reject. This is best illustrated in FIG. 17 which shows the detection signal values (in terms of voltage values) obtained by checking bottles containing a parenteral solution. The solid line represents an ideal flawless bottle, the broken line a defective bottle, i.e. a reject, and the dot-and-dash line a usual acceptable bottle. FIG. 17 reveals that the signal value for the acceptable bottle is close to that for the reject and that misjudgment could readily result depending on the threshold value used. In FIG. 17, time is plotted as the abscissa of the diagram, which however does not show the phase difference so as to reveal the maximum value of the wave form.

An object of this invention is to provide a method of checking sealed containers for pinholes by individually detecting the two discharge current flows generated on the container between a first electrode of first electrode means and two second electrodes of second electrode means respectively and converting the difference between the individually detected values to a detection signal value so as to obtain an increased ratio of the rejection signal value to the acceptance signal value (S/N) and to thereby facilitate the detection of pinholes if any, as distinct from the conventional method in which a discharge current is detected on the container for comparison with a threshold value, the method of this invention thus being adapted for the accurate inspection of the containers without being influenced by the variation in wall thickness, surface stains or errors involved in positioning the container peculiar to a particular container.

Another object of this invention is to provide a system for practicing the above-mentioned method.

These and other objects, features and advantages of the present invention will become apparent from the following detailed description with reference to the accompanying drawings which are intended to illustrative purposes only and in no way limitative. In the drawings.

Figure 1:
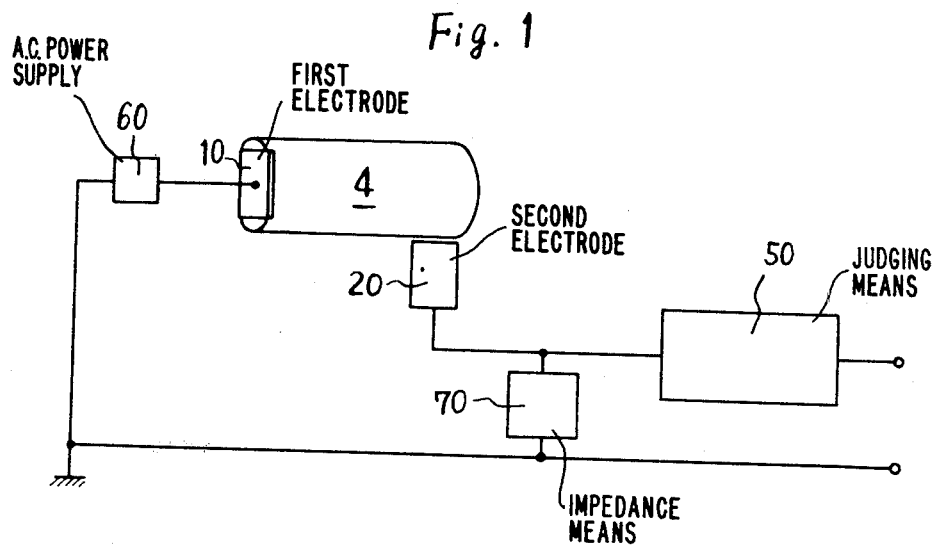
FIG. 1 is a diagram schematically showing an apparatus for practicing a conventional checking method.
Figure 2:
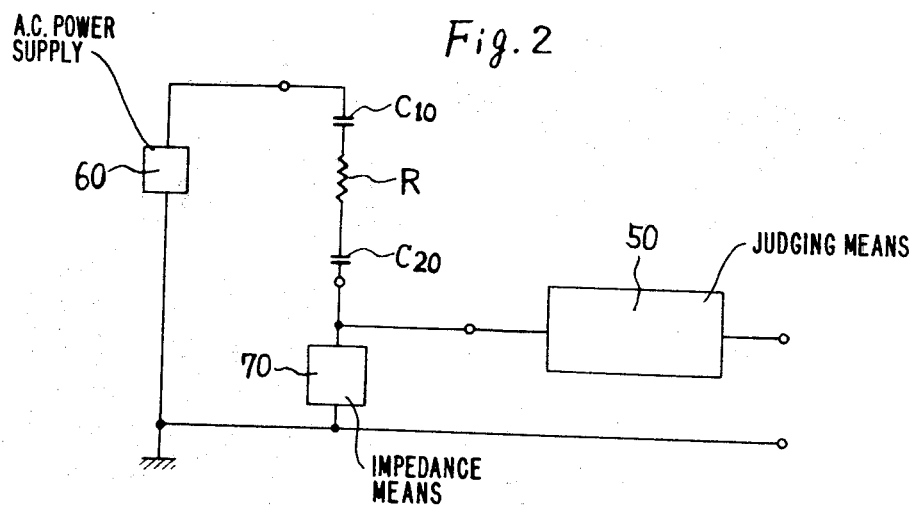
FIG. 2 is a diagram illustrating a circuit electrically equivalent to the apparatus of FIG. 1.
Figure 3:
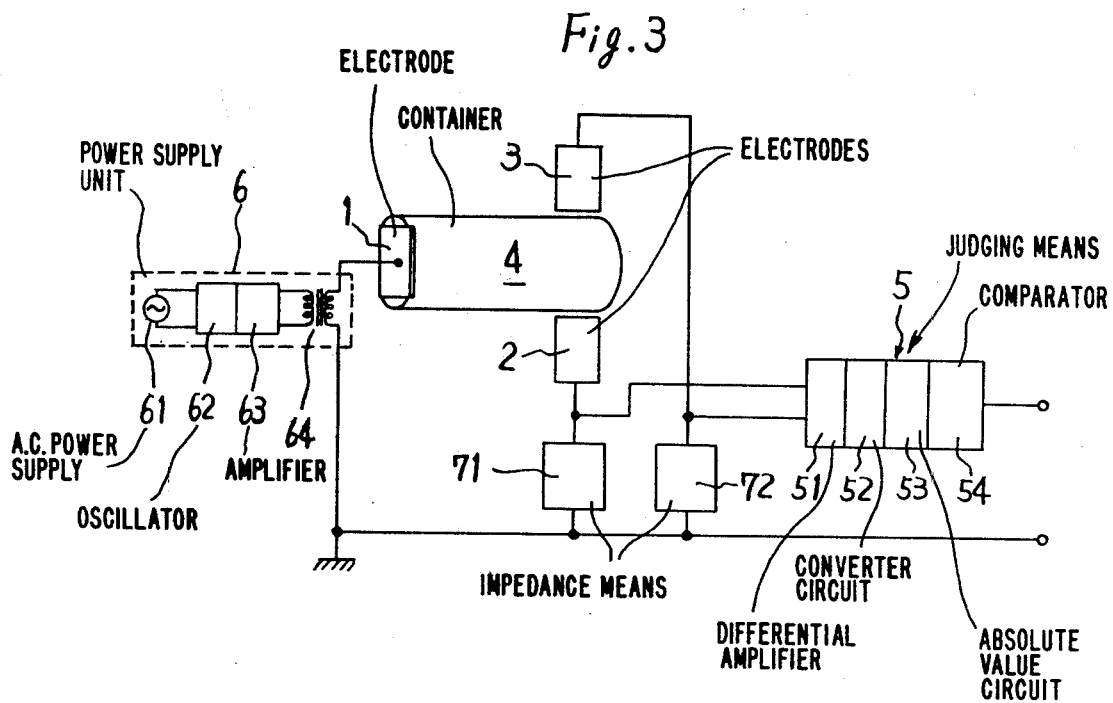
FIG. 3 is a diagram schematically showing a system for practicing the checking method of this invention.

With reference to FIG. 3, a system for practicing the method of this invention comprises a first electrode 1 and two second electrodes 2 and 3. The first electrode 1 includes a single electrode element, and each of the second electrodes has a single electrode element. The second electrodes are equidistantly spaced apart from the first electrode 1. The container 4 to be checked is disposed between the electrode 1 and the electrodes 2, 3. The electrode 2 is connected to one terminal of first impedance means 71. The other second electrode 3 is connected to one terminal of second impedance means 72 arranged in parallel to the first impedance means 71. A power supply unit 6 includes the booster transformer 64 to be described later. The second winding of the transformer 64 is connected to the electrode 1 and to the other terminals of the impedance means 71 and 72. To ensure safety, the latter terminals of the impedance means 71 and 72 are grounded. The power supply unit 6 comprises an A.C. power supply 61, an oscillator 62 for producing the desired alternating wave form from the output of the power supply and also altering the frequency of the output, an amplifier 63 for amplifying the output from the oscillator, and the above-mentioned booster transformer 64 for producing in its secondary winding the desired high voltage from the amplifier output. Thus the power supply unit 6 produces from any low voltage and any low-frequency wave the desired high voltage and desired high-frequency wave in the secondary winding of the transformer 64. The power supply unit 6 affords a voltage which has been adjusted in accordance with the size and material of the container to be checked.

The present system further includes judging means 5 for individually detecting the two flows of discharge currents generated on the container and judging whether the container has a pinhole or not. More specifically the judging means 5 individually detects the current flowing from the electrode 1 to the electrode 2 and the current flowing from the electrode 1 to the electrode 3 and converts the difference between the currents to the difference between the voltages across the terminals of the impedance means 71 and 72. The judging means 5 comprises a differential amplifier 51 connected to the electrodes 2 and 3, a wave form converter circuit 52 for taking out only the wave forms higher than a preset level from the output of the amplifier 51, an absolute value circuit 53 for arranging the output waves of the circuit 52 in the positive or negative direction, and a comparator (voltage level detector) 54 connected to the circuit 53.

Figure 4:
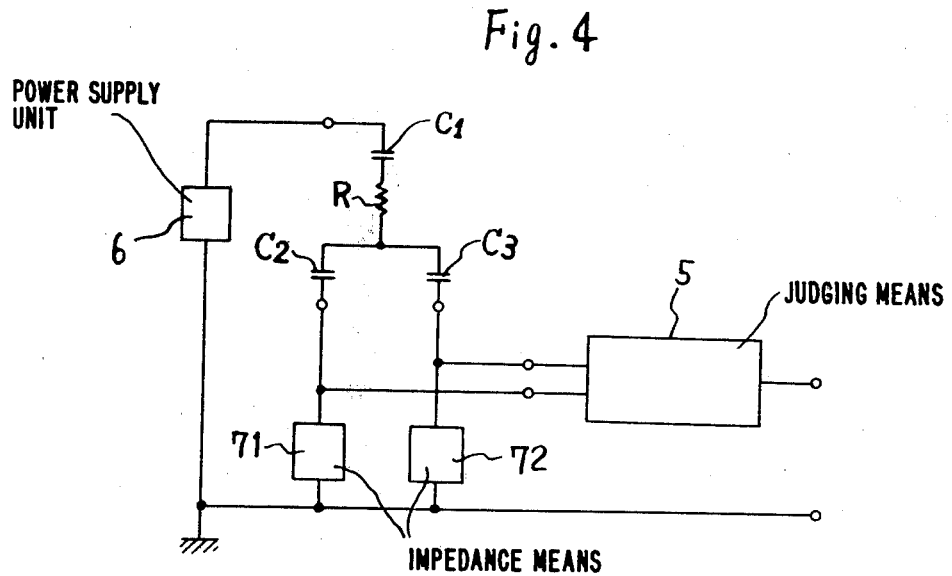
FIG. 4 is a diagram showing a circuit electrically equivalent to the system of FIG. 3.

With reference to FIG. 4 showing a circuit electrically equivalent to the system of FIG. 3, indicated at $C_1$ is the capacitance between the electrode 1 and the contents of the container 4 to be checked, at $C_2$ the capacitance between the electrode 2 and the contents, at $C_3$ the capacitance between the electrode 3 and the contents, and at R the electric resistance of the contents. In the equivalent circuit, the impedance of the closed circuit of: the electrode 1—container 4 —electrode 2—impedance means 71—power supply unit 6 —electrode 1 is made substantially equal to the impedance of the closed circuit of: the electrode 1—container 4 —electrode 3—impedance means 72—power supply unit 6—electrode 1. The impedance means 71 is equivalent to the impedance means 72. The capacitances $C_2$ and $C_3$ are rendered substantially equal to each other. The impedances of the means 71 and 72 are so small as to be negligible relative to the impedances $C_1$, $C_2$, $C_3$ and resistance R.

Figure 5:
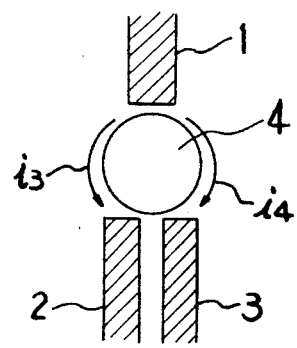
FIG. 5 is a diagram illustrating a flawless container while it is being checked by the method of this invention.
Figure 6:
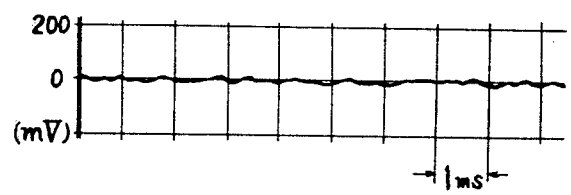
FIG. 6 is a graph (time-detection signal value diagram) showing the result obtained for the container of FIG. 5.

When voltage is impressed across the electrode 1 and the electrodes 2, 3 for a flawless container 4 (free from any pinhole), corona discharge currents $i_3$ and $i_4$ are generated on the container 4 as seen in FIG. 5. If $C_1=C_2$, the currents $i_3$ and $i_4$ are theoretically equal. Nevertheless, actual checking operation involves some difference between the currents $i_3$ and $i_4$, but since the currents $i_3$ and $i_4$ are detected at the same time on a single container to be checked, the difference between the detected values is substantially free from the influence of variations in the wall thickness of the container, stains on the surface thereof or errors involved in positioning the container between the electrodes. Therefore, the difference between $i_3$ and $i_4$ is nearly zero. FIG. 6 is a graph showing the difference, in terms of voltage, between the current detected on the flawless container. The graph indicates that there is little or no difference between the detected values.

Figure 7:
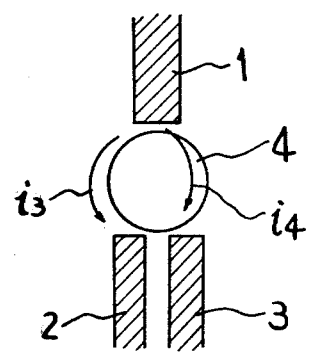
FIG. 7 is a diagram illustrating a defective container while it is being checked by the present method.
Figure 8:
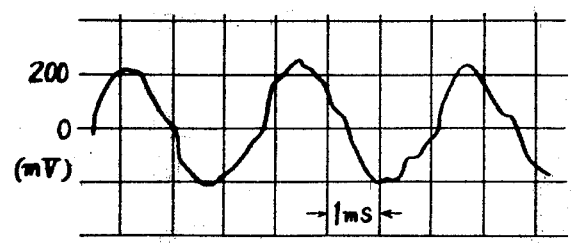
FIG. 8 is a graph (time-detection signal value diagram) showing the result obtained for the container of FIG. 7.

When the container 4 has a pinhole and is defective, a corona discharge current $i_3$ is generated on one side of the container 4 where there is no pinhole, and a spark discharge current $i_4$ appears on the other side thereof where the pinhole is present as illustrated in FIG. 7. The spark discharge current $i_4$ is greater than the corona discharge current $i_3$, hence a marked difference therebetween. FIG. 8 is a graph showing the difference, as converted to voltage, between the currents detected on the defective container. The marked difference is apparently seen.

Figure 16:
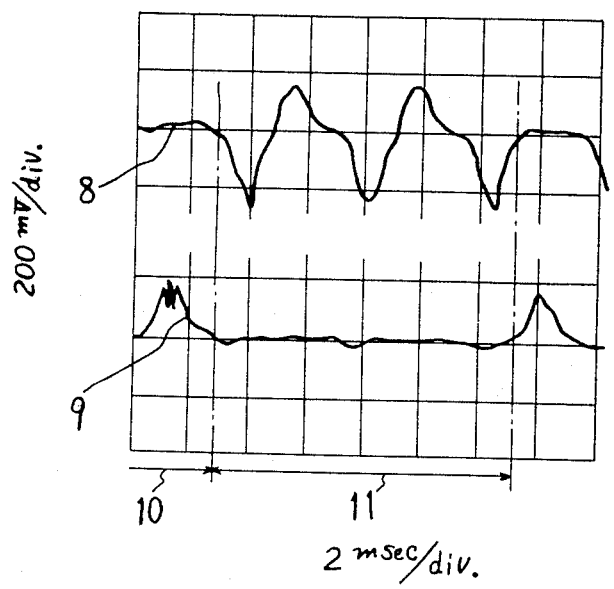
FIG. 16 is a time-detection signal value (voltage) diagram according to this invention when pinholes are positioned at an equal distance from second electrodes respectively.
Figure 17:
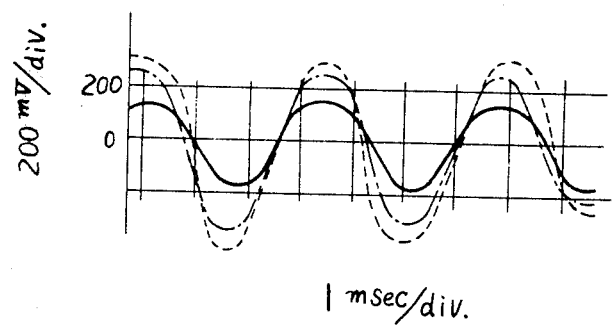
FIG. 17 is a time-detection signal value (voltage) diagram according to the conventional method to show variations in detection signal value.

If the container 4 has a plurality of pinholes on one side of thereof, spark discharge occurs at the pinhole at the smallest distance from the electrode 2 (or 3), while the electrode 3 (or 2) produces corona discharge only, whereby a differential output can be obtained. Further when a plurality of pinholes are present in the vicinity of the electrodes 2 and 3 respectively, spark discharge occurs at only one pinhole which is at the smallest distance from the electrode 2 or 3. In this case, if the electrode 3, for example, produces the spark discharge, corona discharge only occurs at the electrode 2, giving a differential output. If pinholes are positioned at an equal distance from the electrodes 2 and 3 respectively, the electrodes 2 and 3 alternately produce spark discharge, giving a differential output. FIG. 16 is a time-detection signal value (voltage) diagram showing the voltage wave forms involving the elctrodes 2 and 3. With reference to FIG. 16, indicated at 8 is the voltage wave form relating to the electrode 2, and at 9 the voltage wave form in connection with the electrode 3. It is seen that at a portion 10 of the abscissa, spark discharge occurs at the electrode 3 only, whereas at a portion 11 thereof, spark discharge takes place only at the electrode 2.

With the system of this invention described above, the judging means 5 detects the currents $i_3$ and $i_4$ individually and converts the difference therebetween to a voltage value. The converted value indicates the absence of pinholes if it is zero or almost zero, or the presence of a pinhole or pinholes if it is great. Since the presence or absence of pinholes can be determined based on the comparison between the discharge currents detected on the container checked, the present system theoretically does not always require the use of a threshold value, but when desired, the difference between the detected values may be compared with a threshold value for judgment.

Figure 14:
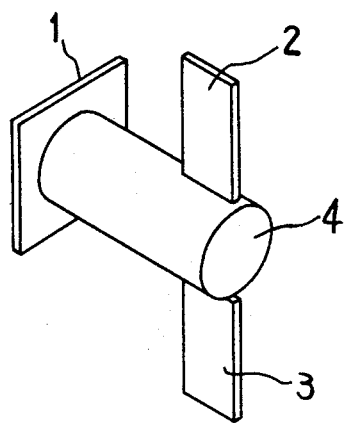
FIG. 14 is a diagram showing a single independent container while it is being checked by the method of this invention.
Figure 15:
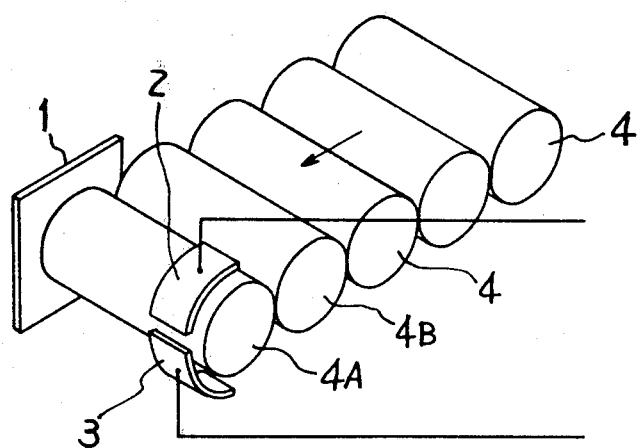
FIG. 15 is a diagram showing a continuous set of five containers during inspection according to the present invention.

While the present method is applicable to a single independent container to be checked as shown in FIGS. 3 and 14, the method is similarly useful for several containers joined together side by side as a group as illustrated in FIG. 15. In the latter case, the grouped containers are placed between the electrodes one after another for checking. Preferably the second electrodes 2 and 3 shown in FIG. 15 are flexible so as not to interfere with the travel of the containers.

Figure 9:
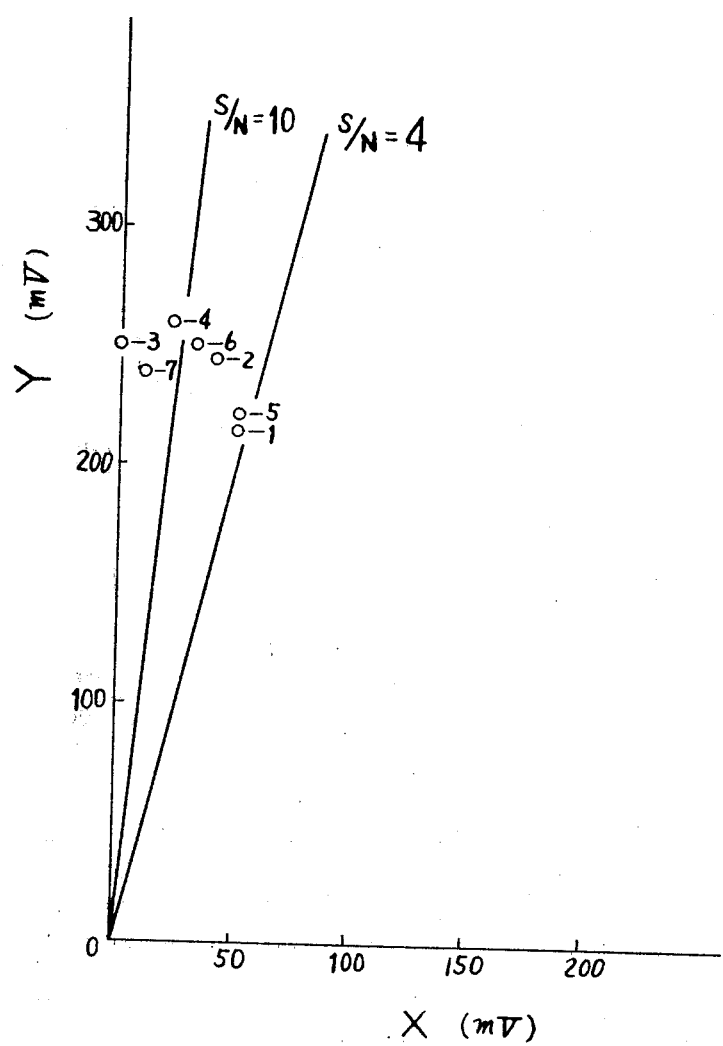
FIG. 9 is a graph showing the relation between the acceptance signal value and rejection signal value obtained by the method of this invention.
Figure 10:
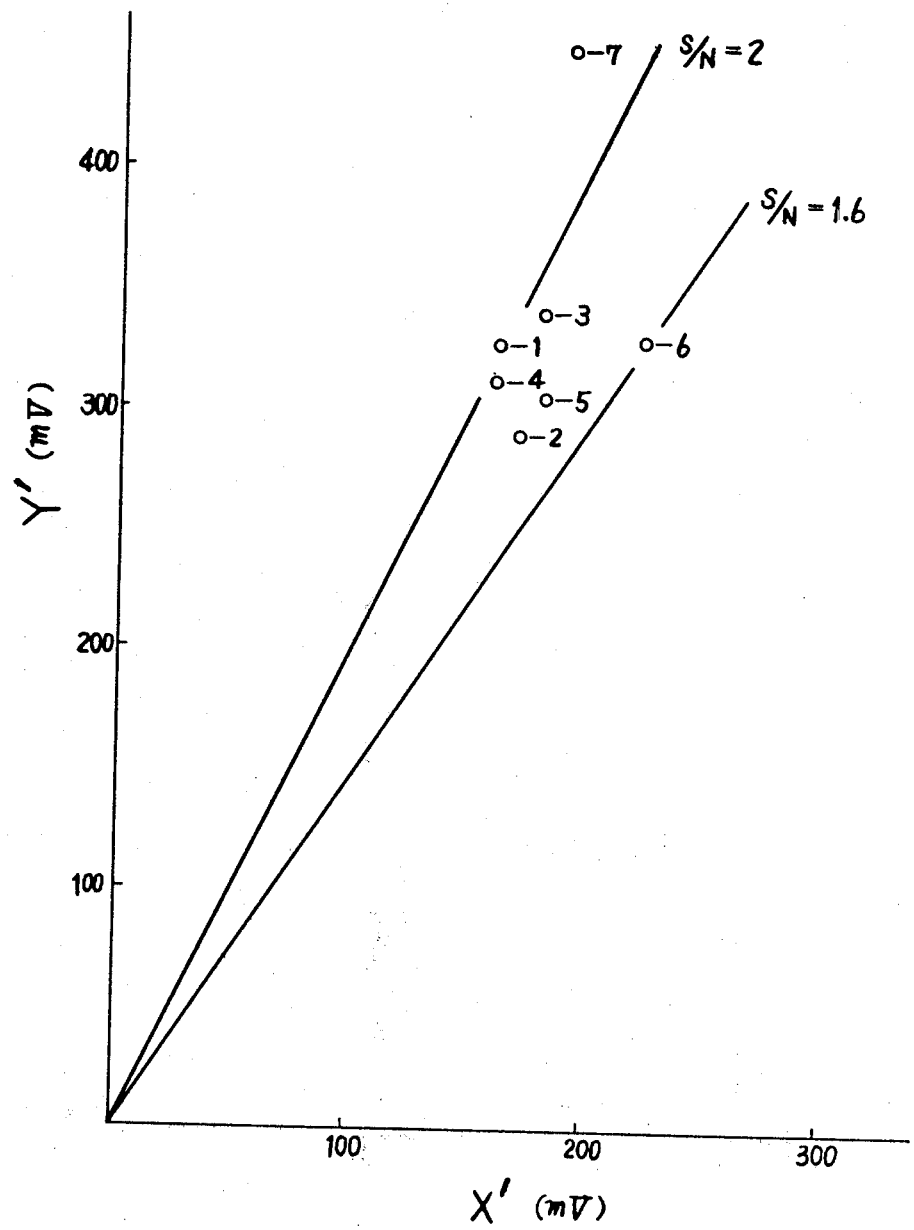
FIG. 10 is a graph showing the relation between the acceptance signal value and rejection signal value obtained by the conventional method.

FIG. 9 is a graph showing the relation between acceptance signal values X and rejection signal values Y given by the differential system of this invention. These acceptance and rejection signal values are each obtained by converting the difference between the detected currents $i_3$ and $i_4$ to a voltage value. FIG. 10 is a graph showing the relation between acceptance signal values X' and rejection signal Y' determined in accordance with the conventional method. Similarly these signal values are in terms of voltage. The signal values given in FIGS. 9 and 10 are obtained by the following procedure. The containers checked were seven sets of sealed polyethylene containers containing a nonelectrolytic sugar solution, each set including five containers joined together side by side (see FIG. 15). In each of the sets of containers, the first container 4A was free from any pinholes, and the adjacent second container 4B was defective (see FIG. 15). The acceptable container 4A and the reject 4B of each set were checked according to the method of this invention to determine acceptance signal values X and rejection signal values Y in seven pairs. With the results obtained, seven points (X,Y) were plotted on a graph as seen in FIG. 9. Similarly the acceptable container 4A and the reject 4B of each set were checked according to the conventional method to determine acceptance signal values X' and rejection signal values Y' in seven pairs, and seven points (X',Y') were plotted on a graph (see FIG. 10). The signal values were measured by a synchroscope for measuring voltage.

FIG. 9 reveals that the acceptance signal values given by the differential method of this invention are in the range of 0 to 50 mV and that the corresponding rejection signal values are in the range of 200 to 300 mV, hence S/N=4 to 10. FIG. 10 indicates that the ratios S/N achieved by the conventional method are 1.6 to 2.0. Thus the present method is exceedingly superior.

Figure 11:
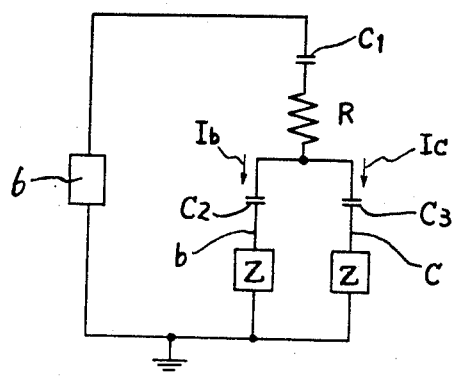
FIG. 11 is a diagram showing a circuit electrically equivalent to the system of the invention shown in FIG. 3 in which the container is flawless.
Figure 12:
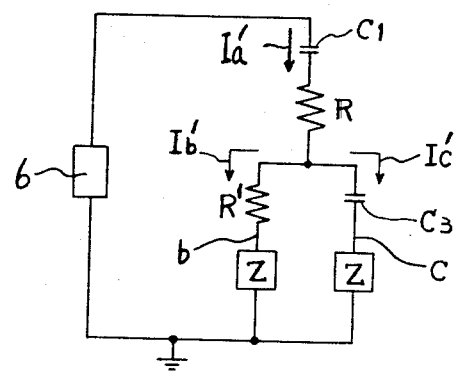
FIG. 12 is a diagram showing a circuit electrically equivalent to the system of the invention shown in FIG. 3 in which the container is defective.
Figure 13:
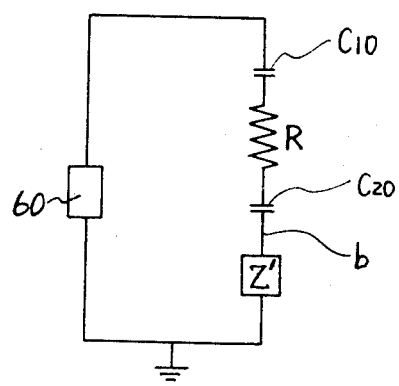
FIG. 13 is a diagram showing a circuit electrically equivalent to a conventional apparatus in corresponding relation to FIG. 11.

With reference to FIGS. 11 to 13, the differences between the present method and the conventional method will be described below with use of mathematic equations. FIG. 11 shows a circuit electrically equivalent to the present system (see FIG. 3) when the container is free from any pinhole, FIG. 12 a circuit electrically equivalent to the present system (see FIG. 3) when the container is a reject with a pinhole, and FIG. 13 a circuit electrically equivalent to a conventional apparatus in corresponding relation to the circuit of FIG. 11. The impedance means 71 and 72 given in FIG. 3 are indicated at Z in FIGS. 11 and 12. The corona discharge currents $i_3$ and $i_4$ generated on the acceptable container are indicated at Ib and Ic in FIG. 11. The spark discharge current and corona discharge current generated on the reject are indicated at Ib' and Ic' in FIG. 12.

An example of simple analysis based on the A.C. theory will be described below in which the impressed voltage is of sine wave.

In the case where the container checked according to this invention is free from any pinholes (see FIG. 11) (wherein the impedance Z is made so small as to be negligible relative to the impedances of $C_1$, $C_2$ and $C_3$ and R), the voltages at points b and c are:

$$Vb = Z \cdot \frac{E}{2(\frac{1}{j\omega C_1} + R + \frac{1}{j2\omega C_2})}$$

$$Vc = Z \cdot \frac{E}{2(\frac{1}{j\omega C_1} + R + \frac{1}{j2\omega C_3})}$$

wherein E is the voltage applied.

$C_2$ and $C_3$ are the capacitance between the container and the second electrodes. Since the electrodes are so adapted that $C_2=C_3$, the differential output for the flawless container is:

$$Vo = Vb - Vc = 0(V) \tag{1}$$

When the container has a pinhole (see FIG. 12), for example, close to $C_2$, spark discharge occurs between the pinhole and the electrode concerned. The current generated includes the current due to the flow of ions released upon breakdown of air which current is greater than the displacement current resulting from the capacitance. The capacitance $C_2$ can be assumed to be resistance R' expressed by:

$$R' = V/I$$

wherein I=i, V is the voltage across the opposite ends of the path of the discharge and I is the current through the discharge path. The absolute value of R' is exceedingly smaller than the absolute value of the impedance given by $C_2$. Thus $C_2$ is interpreted as R' will not be in conflict with the explanation that the non-equilibrium created yields a differential output.

The voltage values at points b and c and the differential output Vo resulting from the presence of a pinhole are:

$$Vb = Z \cdot Ib'$$

$$Vc = Z \cdot Ic'$$

$$\therefore Vo = Z \cdot (Ib' - Ic') \tag{2}$$

wherein $$Ia' = \frac{E}{\frac{1}{j\omega C_1} + R + \frac{R' \frac{1}{j\omega C_3}}{R' + \frac{1}{j\omega C_3}}}$$

$$Ib' = Ia' \cdot \frac{\frac{1}{j\omega C_3}}{R' + \frac{1}{j\omega C_3}}$$

$$Ic' = Ia' \cdot \frac{R'}{R' + \frac{1}{j\omega C_3}}$$

Thus in the presence of a pinhole, the resulting differential output is not zero but is a value in proportion to the difference between $Ib'$ and $Ic'$. To sum up, according to the differential system of this invention, flawless containers theoretically give no output voltage, whereas defective continers afford an output voltage of $Z(Ib'-Ic')$.

When a container free from any pinhole is checked by the conventional system (see FIG. 13), the voltage $Vb$ at a point b is:

$$Vb = Z' \cdot \frac{E}{R + \frac{1}{j\omega C_{10}} + \frac{1}{j\omega C_{20}}} \quad (3)$$

In the case of a defective container, $j\omega C_{20}$ is replaceable by $R''$ which is the resistance of the path of discharge through the pinhole. As a result, the following equation is obtained:

$$Vb' = Z' \cdot \frac{E}{R + \frac{1}{j\omega C_{10}} + R''} \quad (4)$$

There are following differences between the conventional method and the differential method of this invention. With the conventional method, the equations (3) and (4) indicate that the voltage is affected by E, $C_{10}$ and $C_{20}$. More specifically the signal levels detected whether on flawless containers or on defective containers involve variations relative to the threshold value due to variations in the impressed voltage E as well as variations in $C_{10}$ and $C_{20}$ attributable to the varying wall thickness of the container and to errors in positioning the container. The conventional method is not suited to accurate checking operation, therefore. With the present method, the output voltage theoretically is totally unaffected by the impressed voltage E. Even with containers having varying wall thicknesses, there will be no influence on the detected result, if the container has an altered thickness in its entirety instead of localized variations since $C_2$ is then equal to $C_3$. While containers with which $C_2$ is not equal to $C_3$ will not satisfy Equation (1), FIG. 9 indicates that the differential output Vo for flawless containers is much smaller than that for defective containers. Thus the method of this invention is superior to the conventional method in principle as well as in the results actually achieved.

Although in the system described the first electrode includes a single electrode element, it may have a plurality of electrode elements in accordance with the size, shape, etc. of the container to be checked to ensure improved checking accuracy with an expedient electrode arrangement.

Figure 18:
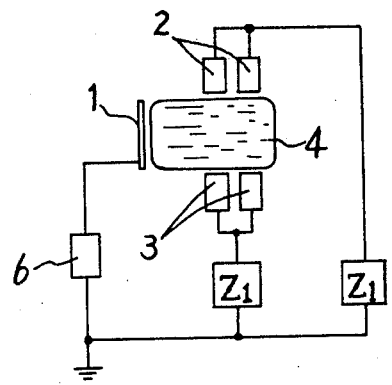
FIGS. 18 and 19 are diagrams illustrating other embodiments of the present system in which each second electrode has a plurality of electrode elements.
Figure 19:
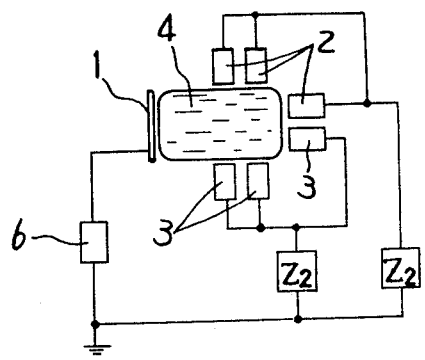
Figure 20:
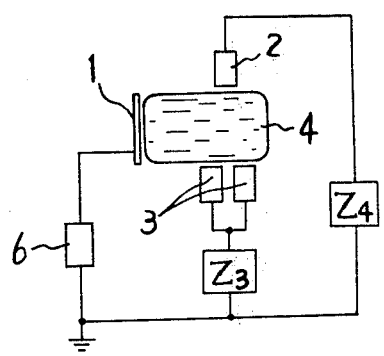
FIG. 20 is a disgram illustrating another embodiment of the present system in which one second electrode includes a plurality of electrode elements and the other second electrode has a single electrode element.

Similarly, one or both of the second electrodes may include a plurality of electrode elements. Thus FIGS. 18 and 19 show embodiments of this invention wherein each of the second electrodes 2 and 3 has a plurality of electrode elements. FIG. 20 shows still another embodiment wherein one second electrode 2 includes a single element and the other second electrode 3 has a plurality of elements. Indicated at $Z_1$ to $Z_4$ in FIGS. 18 to 20 are impedance means.

Although A.C. voltage is impressed across the electrodes in the method described above, D.C. voltage is also usable according to the method of this invention, in which case the speed at which the container travels between the electrodes must be suitably determined relative to the time constant RC inherent in the container, C being a combined capacitance.

Where the method of this invention is resorted to, the contents of the container to be checked must have some conductivity. The present method can be practiced if the resistance of the contents is sufficiently low relative to the insulation resistance of the container.

What is claimed is:

1. In a method for checking sealed containers of electrical insulating material for pinholes with conductive contents so enclosed therein as to permit no grounding by placing a sealed container between first electrode means and second electrode means, impressing AC voltage across the electrode means to generate discharge current on the container and detecting the discharge current, an improvement in which the second electrode means comprises two electrodes, and which method comprises impressing AC voltage so that the discharge current flows are generated between the first electrode means and one of the second electrodes and between the first electrode means and the other of the second electrodes respectively, wherein, with a container free of any pinhole, the two discharge current flows being generated as corona current flows, and wherein, with a container having a pinhole, one of the discharge current flows being generated as a spark discharge current flow corresponding to the pinhole; individually detecting the discharge current flows generated on the container and between the first electrode means and the second electrodes; and determining, based on the difference between the individually detected values, that with the detected differential value higher than a predetermined threshold value, the container has a pinhole or pinholes and that with the differential value lower than the threshold value, the container has no pinhole.

2. A system for checking sealed containers of electrical insulating material for pinholes with conductive contents so enclosed therein as to permit no grounding, said system comprising:
a first electrode having at least one electrode element and two second electrodes each including at least one electrode element;
first impedance means connected at its one terminal to one of the second electrodes;
second impedance means connected at its one terminal to the other second electrodes;
an AC power supply unit connected to the first electrode and to the other terminals of the first and second impedance means, the first and second impedance means and AC power supply unit being all adapted so that when a sealed container is placed between the first electrode and the two second electrodes, discharge current flows are generated between the first electrode and one of the second electrodes and between the first electrode and the other of the second electrodes respectively, and wherein, with a container free of any pinhole, the two discharge current flows being generated as corona discharge currents, and wherein, with a container having a pinhole, one of the discharge current flows being generated as a spark discharge current corresponding to the pinhole; and judging means for individually detecting the discharge current flows generated between the first electrode and one of the second electrodes and between the first electrode and the other of the second electrodes respectively, and judging whether the container has a pinhole or pinholes, or not based on the difference between the detected values.

3. A system as defined in claim 2 wrein the A.C. power supply unit comprises an A.C. power supply, an oscillator for producing a desired alternating wave form from the output of the power supply and altering the frequency of the output, an amplifier for amplifying the output of the oscillator and a booster transformer for producing desired high voltage from the output of the amplifier.

4. A system as defined in claim 2 or 3 wherein the judging means comprises a differential amplifier connected to the two second electrodes, a wave form converter circuit for taking out from the output of the amplifier only the wave forms higher than a preset level, an absolute value circuit for arranging the output waves of the converter circuit in the positive or negative direction and a voltage level detector connected to the absolute value circuit.

5. A system as defined in claim 2 wherein the first electrode, the two second electrodes, the first and second impedance means and the power supply unit are so selected and arranged that the impedance of the closed circuit of the first electrode—the container—one of the second electrode—the first impedance means—the power supply unit—the first electrode is substantially equal to the impedance of the closed circuit of the first electrode—the container—the other second electrode—the second impedance means—the power supply unit—the first electrode.

6. A system as defined in claim 5 wherein the impedances of the first and second impedance means are equal to each other and are so small as to be negligible relative to the impedance of the capacitance $C_1$ between the first electrode and the contents of the container, to the impedances of the capacitances $C_2$ and $C_3$ between the two second electrodes and the contents and to the electric resistance R of the contents, the capacitances $C_2$ and $C_3$ being substantially equal to each other.

* * * * *